(12) United States Patent
Goldberg

(10) Patent No.: US 9,570,108 B2
(45) Date of Patent: Feb. 14, 2017

(54) MAPPING PIXELS TO UNDERLYING ASSETS IN COMPUTER GRAPHICS

(71) Applicant: Apple Inc., Cupertino, CA (US)

(72) Inventor: Brian E. Goldberg, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 144 days.

(21) Appl. No.: 13/668,111

(22) Filed: Nov. 2, 2012

(65) Prior Publication Data

US 2014/0126888 A1    May 8, 2014

(51) Int. Cl.
| H04N 5/93 | (2006.01) |
| G11B 27/034 | (2006.01) |
| G11B 27/029 | (2006.01) |
| G06F 9/44 | (2006.01) |
| G06F 3/01 | (2006.01) |

(52) U.S. Cl.
CPC ............. *G11B 27/034* (2013.01); *G06F 3/01* (2013.01); *G06F 8/33* (2013.01); *G06F 8/38* (2013.01); *G11B 27/029* (2013.01)

(58) Field of Classification Search
CPC ...... G11B 2220/61; G11B 27/029; G06F 8/38; G06F 3/01; G06F 8/33; G06K 9/33
USPC ......... 386/280, 286, 282; 717/110; 382/309; 715/762
See application file for complete search history.

(56) References Cited

U.S. PATENT DOCUMENTS

| 8,910,046 B2* | 12/2014 | Matsuda | G11B 27/034 715/723 |
| 9,317,172 B2* | 4/2016 | Lyons | G06F 3/0481 |
| 9,412,414 B2* | 8/2016 | Wang | G11B 27/034 |
| 2001/0020953 A1* | 9/2001 | Moriwake | G11B 27/034 715/723 |
| 2006/0098941 A1* | 5/2006 | Abe | G11B 27/031 386/279 |
| 2008/0063357 A1* | 3/2008 | Kunieda | G11B 27/034 386/278 |
| 2008/0155421 A1* | 6/2008 | Ubillos et al. | 715/724 |
| 2010/0146042 A1* | 6/2010 | Kruhoeffer | G06Q 30/02 709/203 |
| 2011/0167036 A1 | 7/2011 | Liebman | |
| 2011/0268426 A1* | 11/2011 | Kikuchi | G11B 27/034 386/278 |
| 2011/0307526 A1 | 12/2011 | Roenning | |
| 2012/0017153 A1 | 1/2012 | Matsuda et al. | |

FOREIGN PATENT DOCUMENTS

WO     2007/082167 A2     7/2007

* cited by examiner

*Primary Examiner* — Helen Shibru
(74) *Attorney, Agent, or Firm* — Baker & Hostetler, LLP

(57) ABSTRACT

A system for presenting video and methods for manipulating and delivering the video are presented. An interface may be implemented to access data related to the creation and animation of the video, a reference to the creation data stored with the video itself. Upon selection a portion of the video, using the references stored with the video, the tools needed to edit the selected portion of the video may be presented. The objects and illustration assets utilized to animate a scene may be stored in a memory device such that the objects and assets may be retrieved using a hierarchy of references initially accessed via the reference stored with the selected portion of the video. According to an embodiment, the selected portion may be a frame or a pixel and the reference stored with the frame metadata, pixel value, or image channel or image layer.

23 Claims, 6 Drawing Sheets

200

400

500

600

MAPPING PIXELS TO UNDERLYING ASSETS IN COMPUTER GRAPHICS

BACKGROUND

Aspects of the present invention relate generally to the field of video production, and more specifically to the creation of computer generated images.

In the field of computer graphics and animation for film and television production thousands of individual elements of data contribute to producing the imagery seen in the final product. For example, to produce a scene, several objects may have been rendered using multiple processes and each object may have been created using several assets. For example, an object in a scene may have associated geometries and curves. To create the object, multiple geometries and assets may have been utilized, and to illustrate motion, an object may be associated with a curve, along which the motion of the object will be animated. For example, a tree in a forest consisting of hundreds of trees will have several assets including leaf objects, each having an associated geometry, and assets, including randomization algorithms for the patterns of the leaves on the tree, and curves representing motion of the tree due to wind.

A media file for storing the scene may include a series of frames, each frame having a grid of pixels. Each pixel will have an associated value usually meant for the sole presentation of an image. However, the process of creating that pixel may have been the result of a very complex hierarchy of data that may include modeling, rigging, animation, lighting and rendering of objects in a scene. Additionally, this hierarchy may have been created and modified by multiple users along the production pipeline. Therefore, when accessing the final product, generally an image file, there is no sure way to know which assets were utilized to create the objects in the image. In order to adjust an object in the scene, a user would need to identify which object needs adjustment and all the assets used to make up that object. Such identification is conventionally done manually, is difficult to predict, and often takes a significant amount of time. In some cases it is impossible, for example, functions that produce a random, non-repeatable output often contribute to the final product.

Accordingly, there is a need in the art for a system that provides direct access to the assets that make up a scene such that access to the assets is straightforward and predictable.

BRIEF DESCRIPTION OF THE DRAWINGS

The foregoing and other aspects of various embodiments of the present invention will be apparent through examination of the following detailed description thereof in conjunction with the accompanying drawing figures in which similar reference numbers are used to indicate functionally similar elements.

DETAILED DESCRIPTION

Figure 1:
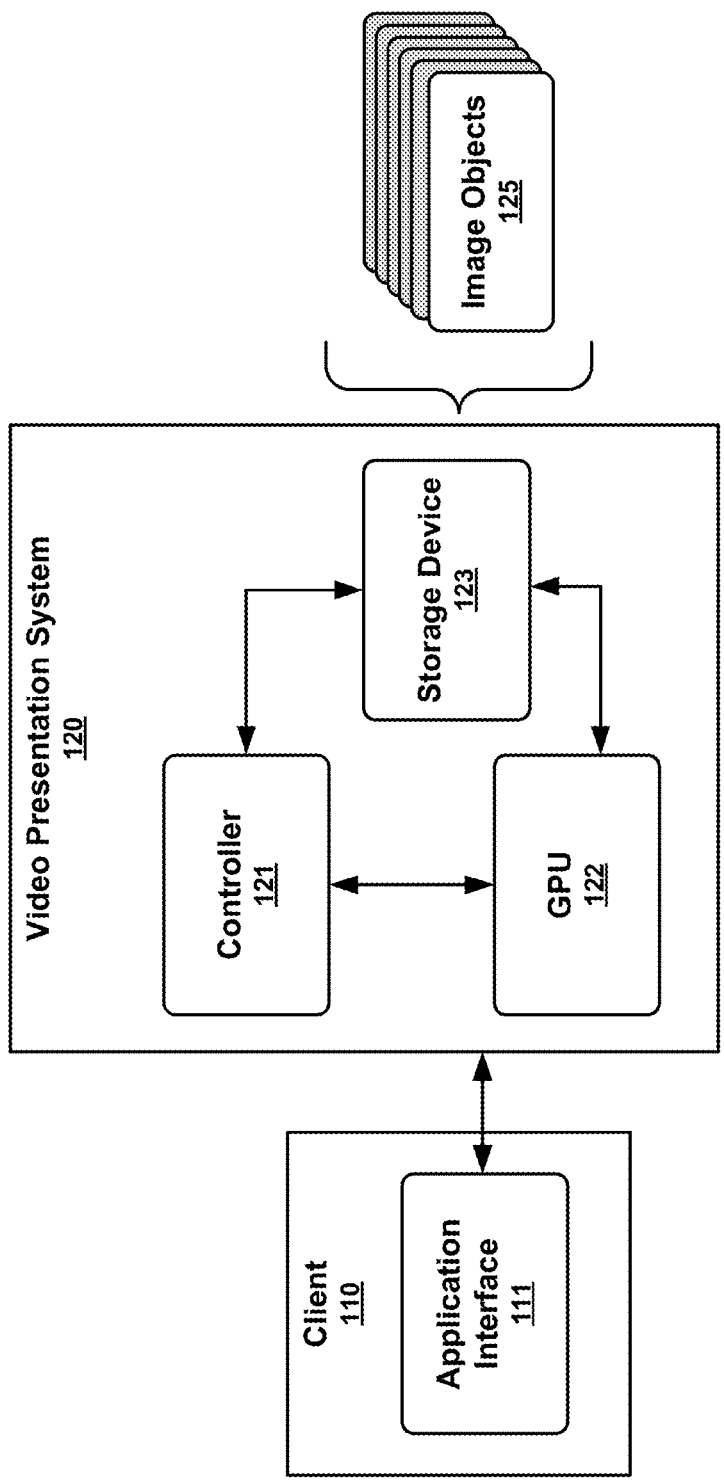
FIG. 1 is a simple block diagram illustrating components of an exemplary video presentation system according to an embodiment of the present invention.

A system for tracking and presenting graphics data and methods used for manipulating and delivering the final product of a production are presented. An interface may be implemented to access data related to the creation and animation of the video data, the reference stored with the video data for easy and efficient access. A user may select a portion of the video data, and using the reference(s) stored with the video data, the tools needed to edit the selected portion of the video data may be presented. Upon completion of the edit, the revised video data may be stored.

During the creation and editing of a video scene, the objects that comprise the scene, and the illustration and other programming assets utilized to animate the scene may each be stored in a memory device such that the records for each of the objects and assets may be retrieved using a hierarchy of references. The hierarchy may initially be accessed via an object reference stored with the selected portion of the video data. According to an aspect of the embodiment, the selected portion may be a frame and the reference stored as part of the file's metadata. According to an aspect of the embodiment, the selected portion may be a pixel and a reference stored that relates each pixel's coordinate in the image file with metadata that aids in locating and/or recreating or re-assembling the underlying assets. Thus an entire object or scene may be recreated from a selected pixel and the associated reference(s).

The interface utilized to access the data hierarchy may be node based and represents graphically, both spatially and temporally, the video production data. Using the interface, nodes may be reorganized, outputs can be tied to different inputs in real time and the data attributes making up the node itself changed such that the effects of the changes can seen in real time. The data displayed and manipulated in this interface is made possible by an underlying database, which then in turn may enable third party software packages to read the records from the database. The interface may restore the state of the instance objects at any point in time and package it in a way that allows an edit to be made to the animation, rigging, lighting, etc. without requiring knowledge of the underlying processes utilized to render the object.

Traversal of the records and references associated with an object may identify a plurality of records that were created or otherwise utilized during object generation and animation. For example, upon selection of an object, the system may collect the records related to the animation curves for the object, the simulation of a physical force on the object, other objects that are part of or otherwise are related to or interact with the selected object, or other related assets. The type of objects collected by the system to complete the related object hierarchy can be as fine-grained as desired, for example the hierarchy can include objects at the granularity of a forest, a single tree in the forest, or a single leaf. Once all of the related are collected and any changes or edits made, the object may be rebuilt using all of the associated references. In this manner, the video presentation system may maintain references to otherwise difficult to identify information.

FIG. 1 is a simple block diagram illustrating components of an exemplary video presentation system according to an embodiment of the present invention. As shown in FIG. 1, a system 100 may comprise a client 110 having a user interface 111 and a video presentation system 120 having a controller 121, a GPU 122, and a memory storage device 123. The client 210 may be implemented on a computer or other processing device. A user may access the video presentation system 120 in a stand-alone system, a client-server environment, or a networked environment.

A user may access image objects or elements 125 stored in the video presentation system 120 with the client 110 via a user interface 111 capable of accessing the video presentation system 120 and the image objects stored therein and delivering to the user or otherwise displaying the information retrieved therefrom. The user interface 111 may be a program or application, may comprise middleware, or may run on a computing device accessible to the user, that acts as a front end to and facilitates access to the video presentation system 120. The user may interact with the user interface 111 through an input device, such as by inputting a selection as with a mouse or a keyboard. The user may observe the response to the access request on an output device or display. In accordance with an aspect of the invention, the user interface 111 may run in a browser or application window controlled by the user.

An image object 125, may be a representation of a scene, an object, an asset, or any other element used in generating the scene that may be represented with an object software model. A plurality of image objects 125 may be stored at the video presentation system 120 in the memory storage device 123. According to an embodiment, the image objects 125 are serialized objects and the memory storage device 123 is a database. Then information about each image object 125 may be stored in a record for each object instance. The image object information may then be retrieved by querying the database.

According to an aspect of an embodiment, the objects may be stored in a database that facilitates mapping each pixel of a scene to the data hierarchy that produced it. Then the media data may be pulled from the database into standard files that may be accessed by conventional third party media editing software.

The interface 111 may enable the user to select a portion of a scene in order to obtain a reference to the assets and objects that were used to create the part of the scene or that otherwise contributed to the final image. The reference may be a unique identifier, an object, or other manner of identification as is known in the art. The reference may then be used to query the database and identify the associated object and asset records.

References may be imbedded in the image file, as references for each pixel associated to an object in the image. For example, if the animation of an object is to be adjusted, the interface may step through the pixel references to build an editing platform that enables the user to make the required changes without any knowledge of the original creation pipeline or even how the associated assets are incorporated into the scene to obtain the revised image. A referenced object may include one or more references to other objects or assets that comprise or were otherwise utilized in the creation of the object. For example, each element in a scene may be modeled by an object such that each character, set piece, environment, landscape, or natural phenomena may be represented by a serialized object. Then each object may reference other objects or assets, including, for example, a model of the cloth that makes up the character's clothing, the simulation engine that simulates an event involving the element object, and other individual elements that comprise the larger element. Thus the hierarchy of such references may be complex and include many references and cross-references.

Figure 2:
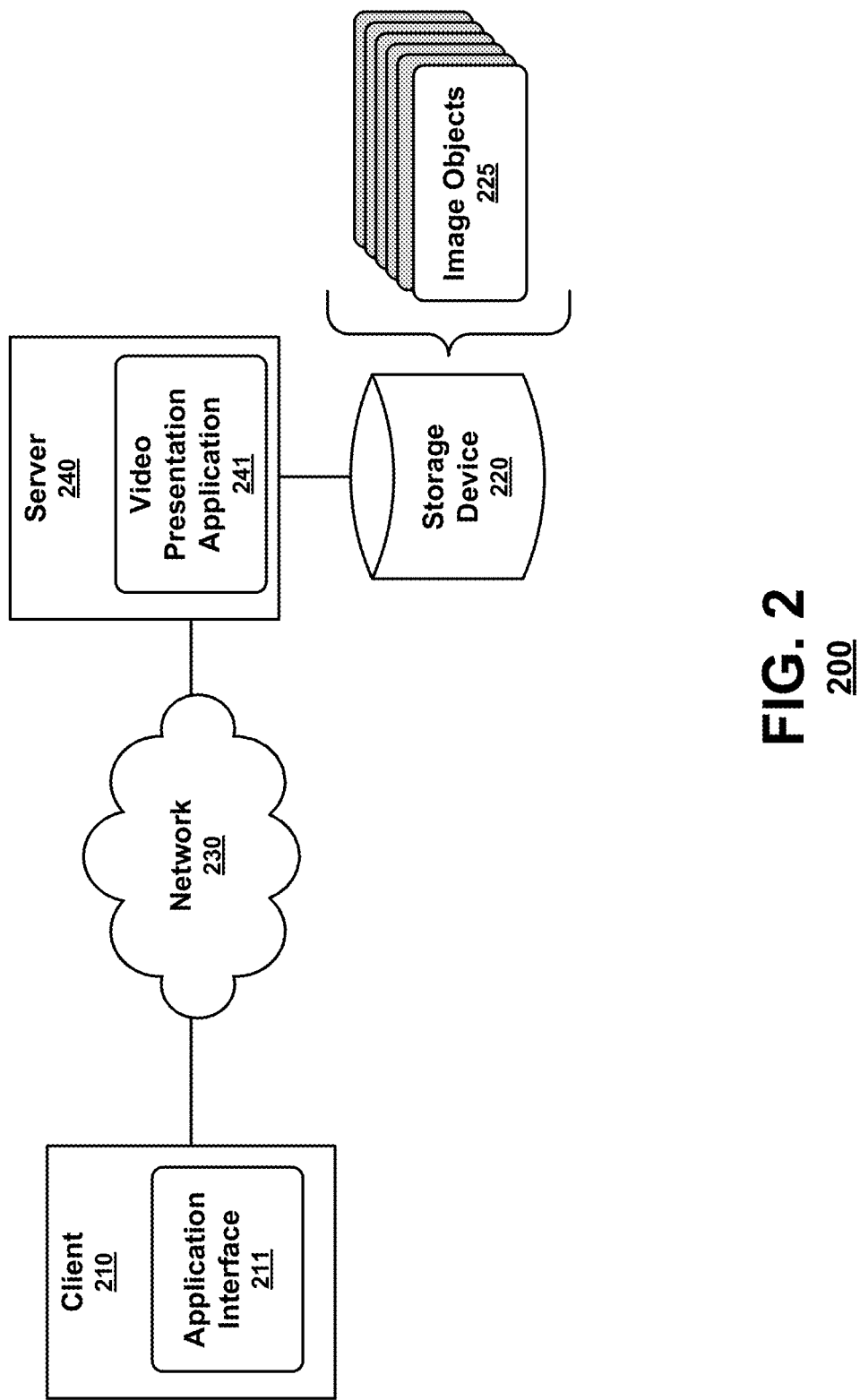
FIG. 2 is a simple block diagram illustrating components of an exemplary video presentation system according to an embodiment of the present invention.

FIG. 2 is a simple block diagram illustrating components of an exemplary video presentation system according to an embodiment of the present invention. As shown in FIG. 2, the client 210 may be connected to a server 240 implementing the video presentation application 241 via a network 230. In a networked environment, the server 240 may be connected to a plurality of clients (not shown) each similar to client 210. The client 210 may be any computing system that facilitates the user accessing the video presentation application 241, for example a personal computer or mobile handheld computing device.

The network 230 connecting the client 210 and the server 240 may be a wired or wireless network that may include a local area network (LAN), a wireless area network (WAN), the Internet, or any other network available for accessing the video presentation application 241 with the client 210. The client 210 may request access to the application 241 and to the stored image objects 225 via a network connection.

Figure 3:
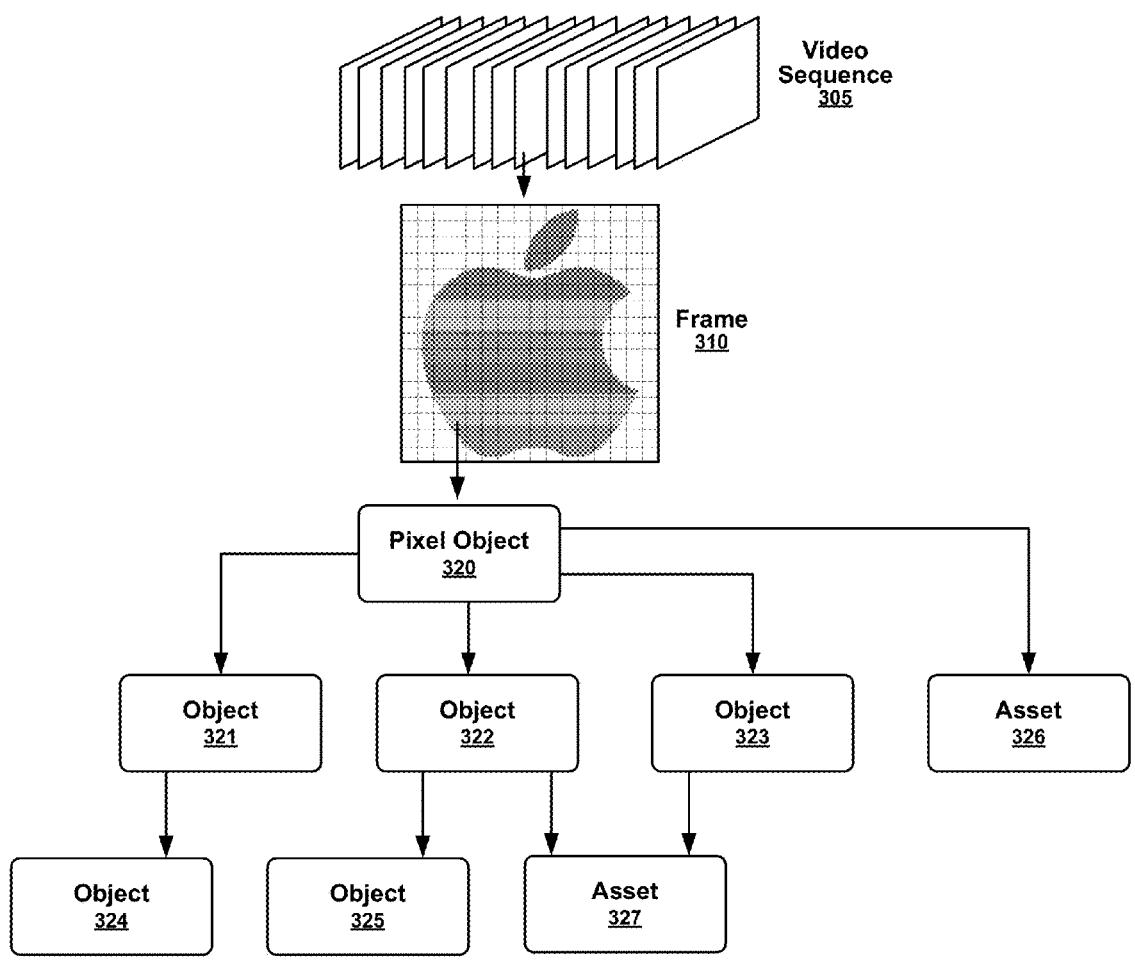
FIG. 3 illustrates an exemplary object hierarchy according to an embodiment of the present invention.

FIG. 3 illustrates an exemplary object hierarchy according to an embodiment of the present invention. As shown in FIG. 3, for a frame 310 in video data having a sequence of frames 305, each pixel may have an associated reference to an object 320 in an object hierarchy. The reference may be to an object, for example an object may represent a character including Yoda, Woody, or Luxo Jr., or a set piece such as a house or a bridge, an exterior environment such as a lunar landscape, or a natural phenomena such as water, snow, or lightning or other scene element. Other elements of the hierarchy may include sub-components from the individual high-level objects, 321-325. Such objects may include the cloth making up a character's outfit, the simulation engine that calculated the physics behind blowing up a bridge, rocks that make up a lunar landscape, or snow flakes that, when run through a simulation engine, combine to form a blizzard. Still other components of the hierarchy may include low level data and assets 326-327 such as the curves that represent the animation walk cycle of the character or object. Such assets may be used as input for the movement of muscles and skin, which in turn may drive the dynamics of the cloth making up the character's costume.

Utilizing the described object hierarchy, the video presentation system may enable a user to analyze a complex object and identify the individual elements of that object. For example, a system user may analyze a bumpy road and identify what part of the bumpiness is based on a model or what part has been displaced by the rendering engine.

According to an aspect of an embodiment, each node in the hierarchy may be represented as a serialized object. The variables for each object instance may include data for each object instance, for example calibration data of the motion capture sensors, the name of the character, the lighting model that describes the reflectance of the fabric the character is wearing, depth of a 3D scene, etc.

Additionally, object based functions may be utilized to process the data stored in the database and to deliver it to the interface as necessary. Thus each object instance may further include various functions to facilitate access to the hierarchy including, for example, exporters to various data formats. Then, via the video presentation system, a media file may be created that includes records for each of the necessary objects and assets utilized to create the scene. The data can then be exported and transferred to other systems or software via a universally recognized file format such as XML. Using XML, the mapping data between each pixel and the associated object record may be encoded into the metadata headers of the binary images.

Figure 4:
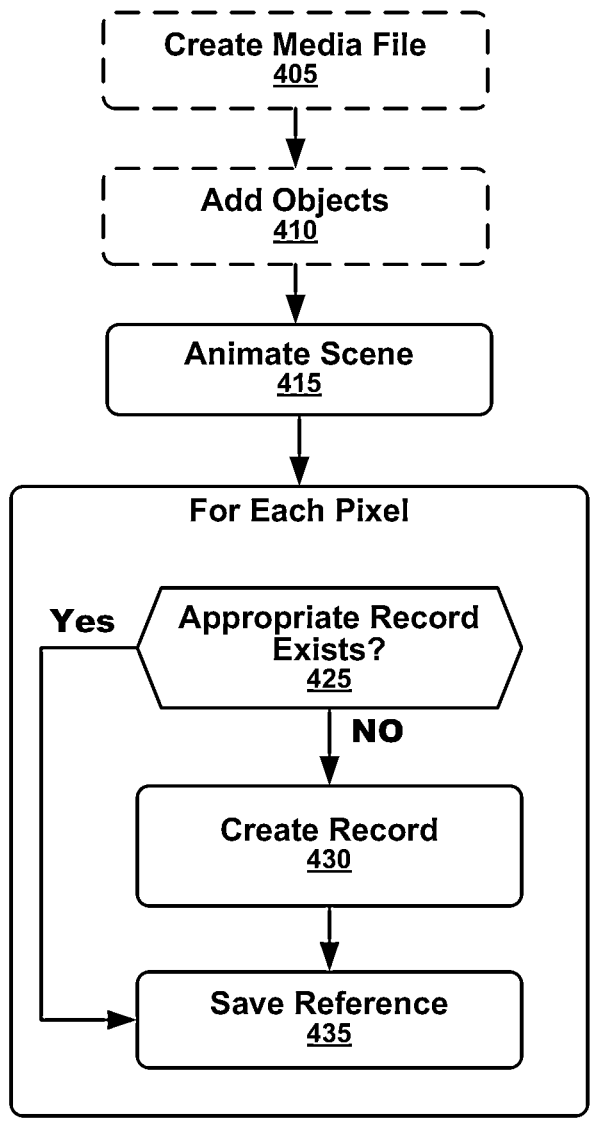
FIG. 4 illustrates a simplified flow chart illustrating an exemplary method for creating a scene according to an embodiment of the present invention.

FIG. 4 illustrates a simplified flow chart illustrating an exemplary method 400 for creating a scene according to an embodiment of the present invention. To create an animation in a scene, objects may be animated using assets of the system (block 415). An object may be animated by adding or altering one or more assets associated with the object. For example, a curve representing motion may be added to an object in order to simulate the motion of the object. Then the curve may be adjusted in order to change the displayed motion. Other examples of relevant assets that may be utilized to animate an object may include topological information, patterns or models of the object, randomization functions, etc. By animating an object, the object may be moved or otherwise altered via a plurality of frames thereby creating an animated scene.

During the creation of the frames, or upon the completion of the editing and when saving the scene to a media file, each pixel of the frames may be saved so as to create a reference to the object record for the object associated with the pixel. To create the reference, the system may first determine whether an instance of the object exists as an object record in the database (block 425). If the object record already exists, a reference may created to the object record and the reference may be saved with the pixel data (block 435). As previously noted, each object record may additionally contain references to additional objects and assets used in creating or editing the object. Thus each object record may contain references to other records. Similar to the original object record, the references to records may be created during the course of creating and editing the object or otherwise at the time the object is saved to the object database. However, if the object record has not yet been created, a new instance of the object may be created and stored in the object database (block 430). Then a reference to the new object record may be saved with the pixel data of the scene (block 435).

As shown in FIG. 4, the method may additionally include the optional steps of creating or otherwise accessing a media file that may be used to store the created scenes (block 405). Similarly, new objects may optionally be added to the file or scene and then edited, or existing objects of the file may be adjusted (block 410). As will be understood, embodiments of the present inventions have applicability for all stages of creating and editing complex scenes using various animation objects and assets.

According to an aspect of an embodiment, once the assets and objects associated with a selected object have been collected, an API may provide access to the records. Then a rendering application may access the records so that the user can utilize and/or change the records to adjust the animation of the object. According to an aspect of the embodiment, existing rendering packages, such as Maya™ or Houdini™, may access and edit the records stored in the video presentation system via such an API.

Figure 5:
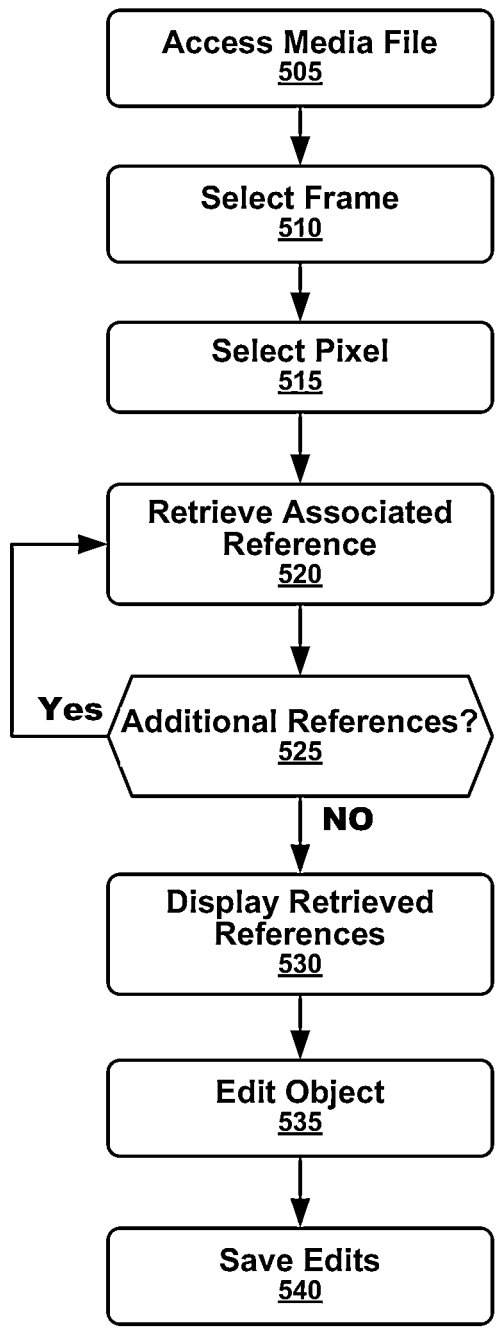
FIG. 5 illustrates a simplified flow chart illustrating an exemplary method for editing a scene according to an embodiment of the present invention.

FIG. 5 illustrates a simplified flow chart illustrating an exemplary method 500 for editing a scene according to an embodiment of the present invention. For example, it may be desirable to adjust the animation of a tree blowing in the wind where the tree is in a forest consisting of hundreds of trees. However, conventional methods do not provide a reference to the assets that comprise the pixels in the image, therefore identifying the specific tree and all the assets used to make up that tree may represent a significant challenge. According to an embodiment of the present invention, each pixel of each tree in the forest may have a reference to information in a database that maintains both the objects and the assets that created the objects associated with each pixel.

As shown in FIG. 5, a scene of a media file may be accessed (block 505). For example, an interface may provide methods for traversing a media file. For a scene that is to be adjusted, a frame in the scene may be selected (block 510). As previously noted, the frame may include a plurality of pixels each having one or more display related values, and an image object reference. Upon selection of an object or pixel in the frame (block 515), the interface may identify the object record associated with the pixel by retrieving the object reference of the pixel (block 520).

Once an object associated with a selected pixel is identified, the assets and objects of the object hierarchy utilized to create that pixel may be identified by retrieving the references associated with the object record and the references associated with references as necessary, traversing the hierarchy until all the necessary objects and assets have been retrieved to edit the scene as desired (block 525). For example, if the desired adjustment requires editing the animation curve associated with the tree, the curve may be retrieved by a reference in the tree record. Then the asset may be displayed by the interface (block 530) and edited by the user as desired (block 535). Edits to objects or assets as well as new assets or objects added during the editing process may be saved and stored in the memory as referenced by the originally selected pixel or the appropriate node in the object hierarchy (block 540).

Figure 6:
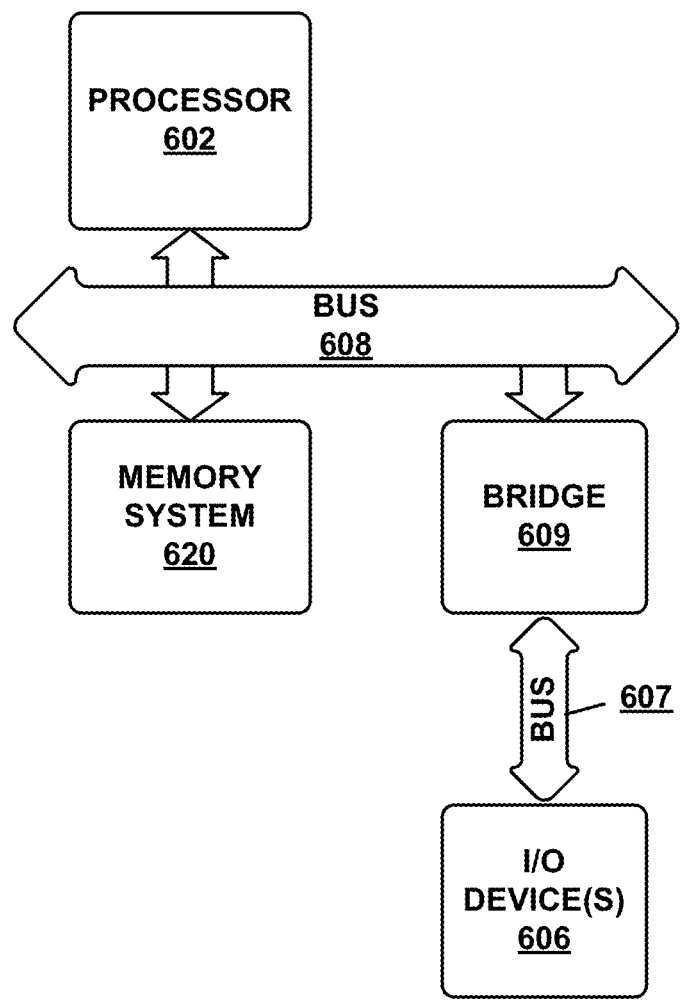
FIG. 6 is a simple block diagram illustrating components of an exemplary client according to an embodiment of the present invention.

FIG. 6 is a simple block diagram illustrating components of an exemplary client 600 according to an embodiment of the present invention. As shown in FIG. 6, the client 600 configured to implement the video presentation system as described herein may include a processor 602, a memory system 620 and one or more input/output (I/O) devices 606 in communication. The communication can be implemented in a variety of ways and may include one or more computer buses 607, 608 and/or bridge devices 609 as shown in FIG. 6. The I/O devices 606 can include network adapters and/or mass storage devices from which the client 600 can receive commands for executing the video presentation system.

As shown in FIG. 1, a client 600 may be a stand-alone system, as may be of particular interest where the video data is highly confidential or too extensive for effective network transmission. Additionally, according to an aspect of an embodiment as shown in FIG. 2, a client 600 may be part of a networked environment.

As discussed above, FIGS. 1 and 2 illustrate functional block diagrams of exemplary systems. In implementation, the components of the systems may be embodied as hardware systems having specific circuit sub-systems to implement the functionality of the video presentation system. Alternatively, the components of the systems may be embodied as software systems having program modules within software programs to implement the described functionality of the system. In yet another embodiment, the systems may be hybrid, involving both hardware circuit systems and software programs. Other implementations also may be used. Moreover, not all of the functional blocks described herein need be provided or need be provided as separate units. For example, although FIG. 1 illustrates the components of an exemplary system, some or all of them may be integrated, for example, the functionality described above with respect to the controller 121 may be executed by the GPU 122. Such implementation details are immaterial to the operation of the present invention unless otherwise noted above.

In some applications, the modules described hereinabove may be provided as elements of an integrated software system, in which the blocks may be provided as separate elements of a computer program. Some embodiments may be implemented, for example, using a non-transitory computer-readable storage medium or article which may store an instruction or a set of instructions that, if executed by a processor, may cause the processor to perform a method in accordance with the disclosed embodiments. Other applications of the present invention may be embodied as a hybrid system of dedicated hardware and software components.

The exemplary methods and computer program instructions may be embodied on a non-transitory machine readable storage medium. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. The machine readable storage media may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

While the invention has been described in detail above with reference to some embodiments, variations within the scope and spirit of the invention will be apparent to those of ordinary skill in the art. Thus, the invention should be considered as limited only by the scope of the appended claims.

I claim:

1. A method for editing composite video data generated from a plurality of sources, comprising:
   in response to a selection of a portion of displayed video at a given time, identifying a reference to an object hierarchy associated with the selected portion at the given time, the reference stored with the selected portion, the object hierarchy describing as respective objects a plurality of output settings used in the creation of the selected portion of the displayed video at the given time, the selected portion corresponding to different object hierarchies at different times;
   retrieving a tool of the object hierarchy from memory;
   displaying the selected portion and the retrieved tool; and
   upon receiving a command to edit a portion of the retrieved tool, editing the tool and saving the edits to the tool.

2. The method of claim 1, further comprising:
   retrieve an additional tool by accessing a reference in the retrieved tool.

3. The method of claim 1, further comprising:
   until no new tools are available, retrieve additional tools wherein the tools include references to other tools.

4. The method of claim 1, wherein said portion of the video data is a pixel.

5. The method of claim 4, wherein said reference to the object hierarchy is stored with a value of each pixel.

6. The method of claim 1, wherein said portion of the video data is a frame.

7. The method of claim 6, wherein said reference to the object hierarchy is stored with a header of the frame.

8. The method of claim 1, wherein the tool in the object hierarchy is an instance of an object model.

9. The method of claim 1, wherein the tool in the object hierarchy is an asset used to animate an object.

10. The method of claim 1, wherein retrieving said tool further comprises querying a database.

11. The method of claim 1, wherein an application program interface (API) is used to retrieve said tool.

12. The method of claim 1, wherein said reference to the object hierarchy is stored in a header of the video data.

13. The method of claim 12, wherein said header is an XML header.

14. A system comprising:
   a memory device for storing information from a plurality of sources used to create a video sequence;
   an interface configured to display the video sequence, to receive a selection of a portion of displayed video at a given time, to identify a reference stored with the selected portion at the given time to an object hierarchy stored in the memory device, the object hierarchy describing as respective objects a plurality of output settings used in the creation of the selected portion of the displayed video at the given time, the selected portion corresponding to different object hierarchies at different times, the reference stored with the video sequence; and
   a controller configured to manage access to tools stored in the memory device, to retrieve a tool of the object hierarchy from the memory device and upon receiving a command to edit a portion of the retrieved tool, editing the tool and saving the edits to the stored tool.

15. The system of claim 14, wherein said portion of the displayed video is a pixel.

16. The system of claim 15, wherein said reference to the object hierarchy is stored with a value of each pixel.

17. The system of claim 14, wherein said memory device is a database and said controller is further configured to retrieve said stored tool by querying the database.

18. The system of claim 14, wherein said reference is stored in a header of the displayed video.

19. A non-transitory computer readable medium storing program instructions that, when executed by a processing device, cause the device to:
   in response to a selection of a portion of composite video data at a given time generated from a plurality of sources, identifying a reference to an object hierarchy associated with the selected portion at the given time, the reference stored with the selected portion, the object hierarchy describing as respective objects a plurality of output settings used in the creation of the selected portion of the composite video data at the given time, the selected portion corresponding to different object hierarchies at different times;
   retrieving a tool of the object hierarchy from memory;
   displaying the selected portion and the retrieved tool; and
   upon receiving a command to edit a portion of the retrieved tool, editing the tool and saving the edits to the tool.

20. The non-transitory computer readable medium of claim 19, wherein said portion of the video data is a pixel.

21. The non-transitory computer readable medium of claim 20, wherein said reference to the object hierarchy is stored with a value of the pixel.

22. The non-transitory computer readable medium of claim 19, wherein retrieving said tool further comprises querying a database.

23. The non-transitory computer readable medium of claim 19, wherein said reference is stored in a header of the video data.

\* \* \* \* \*